United States Patent [19]
Woginrich, Jr.

[11] Patent Number: 5,481,171
[45] Date of Patent: Jan. 2, 1996

[54] METHOD AND APPARATUS FOR SYMMETRICAL CURRENT STARTING OF POLYPHASE INDUCTION MOTORS

[75] Inventor: Thomas J. Woginrich, Jr., Springfield, Oreg.

[73] Assignee: James River Corporation of Virginia, Richmond, Va.

[21] Appl. No.: 192,625

[22] Filed: Feb. 7, 1994

[51] Int. Cl.⁶ ........................................................ H02P 1/26
[52] U.S. Cl. ............................................ 318/778; 318/798
[58] Field of Search .................................... 318/778–781, 318/782–797, 798–812, 254, 138, 439

[56] References Cited

U.S. PATENT DOCUMENTS

| | | | |
|---|---|---|---|
| 4,470,001 | 9/1984 | Resch et al. | 318/810 |
| 4,482,853 | 11/1984 | Bhavsar | 318/778 |
| 4,628,241 | 12/1986 | Bristow et al. | 318/778 |
| 4,752,725 | 6/1988 | Ominato | 318/807 |
| 4,800,326 | 9/1989 | Unsworth | 318/729 |
| 4,950,970 | 8/1990 | Davis, Jr. et al. | 318/809 |
| 5,140,247 | 8/1992 | Verbos | 318/809 |
| 5,168,202 | 12/1992 | Bradshaw et al. | 318/608 |
| 5,206,572 | 4/1993 | Farag et al. | 318/778 |

*Primary Examiner*—David S. Martin
*Attorney, Agent, or Firm*—Sixbey, Friedman, Leedom & Ferguson

[57] ABSTRACT

A motor starter minimizes transient asymmetrical current to an A.C. induction motor during start-up. Desired timing of closing each phase is calculated using the reactance/resistance ratio (X/R) of the motor and calculated capacitive ($X_C$) and inductive ($X_L$) reactances and resistances (R) of the motor circuit cable. A target closing angle of the first phase that crosses zero potential of the voltage cycle is determined based on the system X/R ratio, and that phase of the starter is closed individually. After the first phase is closed, the power frequency is used to determine closing of the other phases at 60 degrees intervals corresponding to the X/R-based target timing.

19 Claims, 3 Drawing Sheets

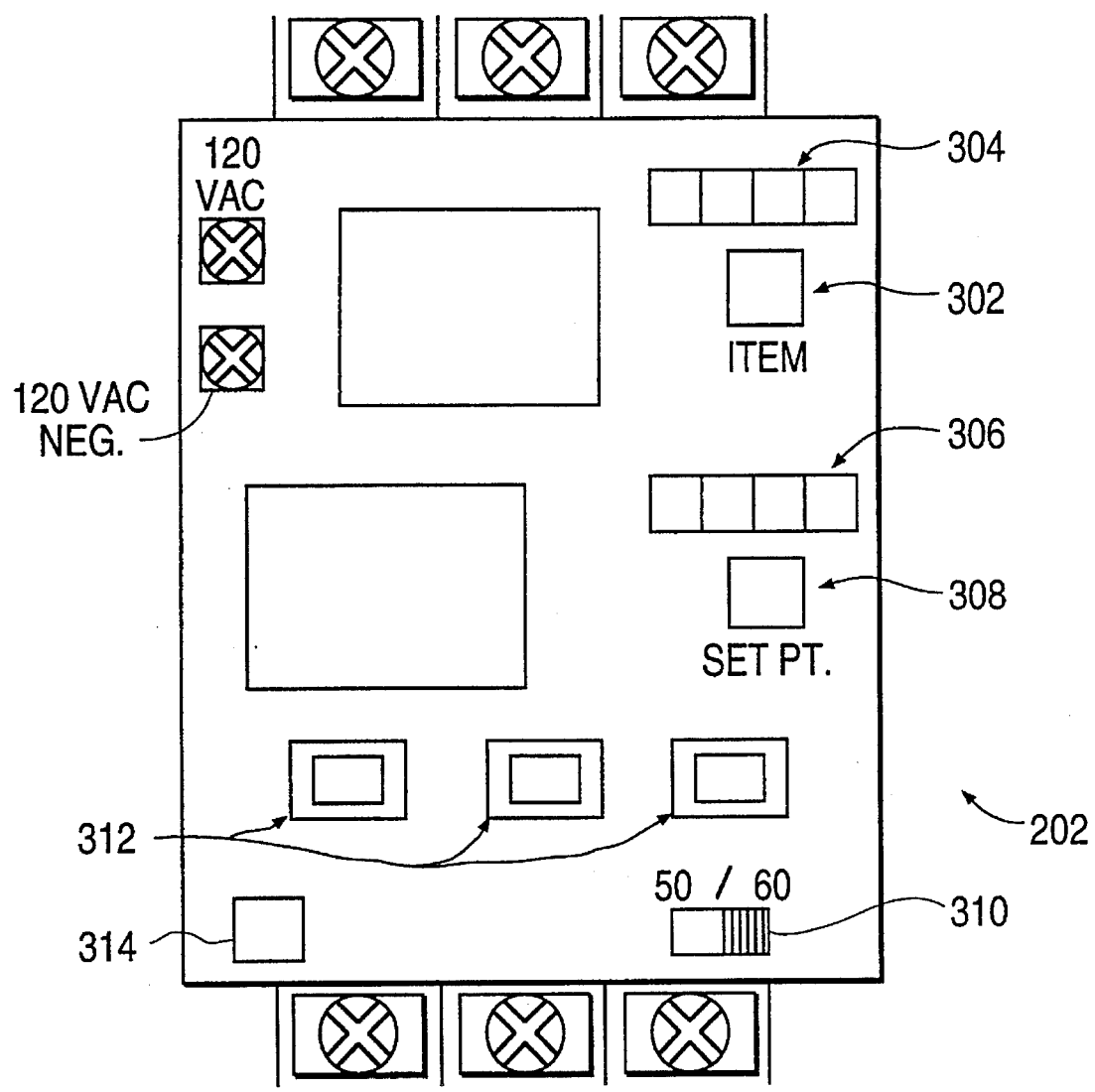

METHOD AND APPARATUS FOR SYMMETRICAL CURRENT STARTING OF POLYPHASE INDUCTION MOTORS

BACKGROUND OF THE INVENTION

In recent years, environmental, regulatory, and financial factors have prompted new electrical motor designs. In the United States, new laws will soon mandate that commercial and industrial users of A.C. induction motors use only motors which meet specific requirements for energy efficiency. Utilities also provide incentives to commercial and industrial users to encourage the use of these more efficient motors. As a result, induction motors with a high-efficiency design have become more prevalent.

A ratio of inductive reactance ($X_L$) to resistance (R), known as the X/R ratio, can be found for any motor. This ratio can generally be obtained from the manufacturer, although X/R ratio data is not always distributed with motors. In general, the inventor has found that the design characteristics of the new highly-efficient motors produce X/R ratios greater than those of previous motors.

Because of certain design characteristics of the energy efficient A.C. induction motors, industrial power control circuits may interact with these motors in an undesired manner. In particular, nuisance tripping of instantaneous trip circuit breakers (provided for short-circuit protection) has been a problem during start-up of these motors. It has been determined by the inventor that nuisance tripping is caused by an additive effect of current asymmetries induced during startup of energy efficient A.C. motors. While standard design motors may also draw current asymmetrically, the asymmetric components are much larger in energy efficient motors, and the substantial asymmetries during startup may be misinterpreted by circuit breakers as short circuits between phases producing an unnecessary shutdown.

For safety reasons, it is necessary to maintain exceptional sensitivity and provide an instantaneous response in the circuit breakers associated with these industrial motors. Ground faults and similar problems may present a life-threatening hazard, or may damage costly equipment because of the substantial currents present in the motors and their switchgear. Phase-to-phase short circuits or ground faults may explosively destroy the motors and associated equipment, posing a severe threat to personnel in the area.

Since large startup current asymmetries are inherent in high-efficiency motor designs, and instantaneously responsive circuit breakers are essential to industrial safety, some amount of nuisance tripping has been viewed as unavoidable in industrial applications of high-efficiency motors. In general, motor starter circuits have not been viewed as providing a substantial solution to this problem.

Motor starter circuits that attempt to minimize in-rush current to a polyphase motor have been provided for other reasons, such as to reduce line fluctuations, as disclosed in U.S. Pat. No. 4,628,241 to Bristow. Bristow shows a start-up control method for an induction motor where each phase has a thyristor or triac to control its firing. The first one or two phases are initially fired at a preset angle (35 to 45 degrees) after a zero crossing of the phase voltage. Subsequent firings may be timed for 50–60 degrees after the first firing. The timing angles are successively varied to provide a "soft" start.

Additional motor starters that control phase timing are disclosed in U.S. Pat. No. 4,482,853 to Bhavsar, U.S. Pat. No. 5,206,572 to Farag et al., U.S. Pat. No. 5,168,202 to Bradshaw et al., U.S. Pat. No. 5,140,247 to Verbos, U.S. Pat. No. 4,950,970 to Davis et al., U.S. Pat. No. 4,800,326 to Usworth, U.S. Pat. No. 4,752,725 to Ominato, and U.S. Pat. No. 4,470,001 to Resch et al.

The prior art, however, fails to provide a contactor which can be constructed easily and cost-effectively, yet minimizes nuisance tripping. In particular, as far as the inventor is aware, the prior art does not provide a contactor in which a phase is initially closed in a relationship with a zero crossing based on the characteristics of the particular motor to minimize nuisance tripping.

SUMMARY OF THE INVENTION

Therefore, it is a general object of the present invention to provide a novel and improved motor starter for starting energy efficient induction motors with minimal nuisance tripping.

Another general object of the present invention is to provide a novel and improved polyphase induction motor starter which starts the motors by sequentially and separately applying power to the phase coils.

A further object of the present invention is to provide a novel and improved motor starter which uses a motor-specific electrical parameter reflecting the electrical characteristics of the motor to calculate desired timing of phase power application.

Another object of the present invention is to provide a novel and improved motor starter which uses a motor-specific parameter reflecting the electrical characteristics of the particular motor to calculate a desired delay time for applying power to a phase relative to a line cycle.

Yet another object of the present invention is to provide a novel and improved motor starter which uses a parameter reflecting the electrical characteristics of the particular motor to calculate a desired delay time for applying a first phase of polyphase power, then connects the first phase at the appropriate time and subsequently connects the remaining phases at intervals based on the timing of the first phase connection.

An additional object of the present invention is to provide a novel and improved motor starter which uses a parameter reflecting the electrical characteristics of the particular motor to calculate a desired delay time for applying a first phase of three phase power, connects the first phase at the calculated time, and connects the remaining phases at successive intervals of sixty electrical degrees.

It is also an object of the present invention to provide a novel and improved motor starter which uses the X/R ratio of the controlled motor to calculate a desired delay time from a line voltage zero for applying a first phase of three phase power, connects the first phase at the calculated time, and connects the remaining phases at successive intervals of sixty electrical degrees.

These objects and others are achieved by providing a motor starter that minimizes transient asymmetrical current to an A.C. induction motor during start-up. Desired timing of closing each phase is calculated using the reactance/resistance ratio (X/R) of the motor and calculated capacitive ($X_C$) and inductive ($X_L$) reactances and resistances of the motor circuit cable. A target closing angle of the first phase that crosses zero potential of the voltage cycle is determined based on the system X/R ratio, and that phase of the starter is closed individually. After the first phase is closed, the power frequency is used to determine closing of the other phases at 60 degrees intervals corresponding to the X/R-based target timing.

BRIEF DESCRIPTION OF THE DRAWINGS

FIG. 3 is a view of a display and data entry panel used in the present invention.

DETAILED DESCRIPTION OF THE PREFERRED EMBODIMENTS

Figure 1:
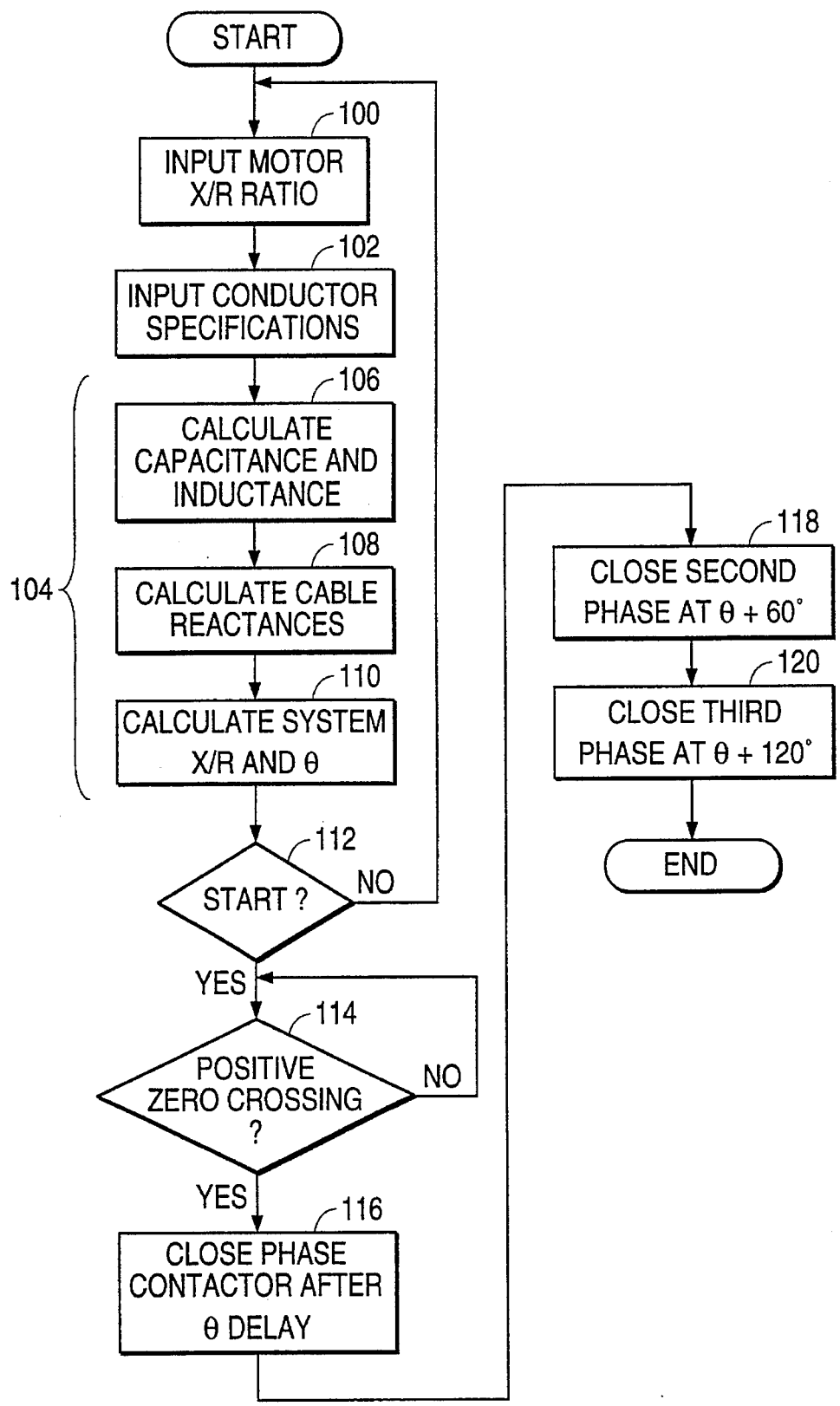
FIG. 1 is a flowchart showing a preferred contact closing method illustrative of the present invention.

The present invention provides an apparatus and method for eliminating or greatly minimizing transient asymmetrical current to a polyphase A.C. induction motor during start-up. This goal is achieved in the present invention by providing a novel and improved three-phase motor starter that uses the known X/R ratio of the motor and calculated capacitive (Xc) and inductive ($X_L$) reactances and resistances of the motor circuit cable to establish exact closing angles for A.C. voltage cycles, thereby producing currents with minimal asymmetrical components.

Initially, the theoretical underpinnings of the invention will be discussed in detail to facilitate a more complete understanding of the exemplary embodiments disclosed herein.

Energy efficient motors are designed to minimize power losses, and in general this has been accomplished by increasing the amount and size of winding materials. These construction differences increase inductive reactance ($X_L$) and decrease resistance (R), so that more energy efficient motors generally have a larger X/R ratio. The larger X/R ratio makes the asymmetrical components of current significant for a longer time during startup. In particular, a substantial DC transient current is generated at startup, and decays exponentially over time. Because this transient current adds to the inherent AC motor startup transient, instantaneous trip circuit breakers used with industrial induction motors may react to the sum transient, falsely detect a short circuit fault, and trip out the circuit.

The inventor has determined that initial motor starting conditions closely parallel conditions found in short circuit analysis. A motor is essentially a short circuit upon initial application of an A.C. voltage. An induction A.C. motor system is made up of reactance and resistance, which is cumulatively impedance as given by $$Z = SQRT(X^2 + R^2) \qquad (1)$$

Induction A.C. motor system loads typically have a more inductive reactance level, unless there is an excess of synchronous motors or power factor capacitors on-line. Resistive circuits provide current in phase with the voltage, but in pure reactance circuits, current lags voltage by 90°.

The inventor has found that in a purely reactive circuit, a highly symmetrical current can be obtained by closing the circuit at voltage maximum, where current will act at its maximum rate of change, but symmetrically about zero. In contrast, if circuit closing occurs at voltage zero, the current lags the voltage, and the current becomes offset "asymmetrically" to provide the 90° lag demanded by the reactive circuit. The term "positive zero crossing" will be used herein to describe a voltage zero crossing where the voltage moves from negative before to positive after the zero crossing.

In circuits containing both reactance and resistance, voltage zero closure still creates maximum asymmetry, but the pure symmetrical current depends on the X/R ratio. The point on the voltage wave where a pure symmetrical current would be produced, measured from a positive zero crossing, is the angle whose tangent equals the X/R ratio of the circuit:

$$\Theta = tan^{-1} X/R \qquad (2)$$

For a typical energy efficient motor, $\Theta$ will be 80 to 90 degrees. This angle is determined for the first phase that crosses voltage zero to positive voltage. Knowing the angle $\Theta$ at which to close, the necessary time delay between zero crossing and closing can be calculated to establish a closing time for the first phase at $\Theta$ degrees after the positive zero voltage crossing, and the phase can be connected to the motor at that time.

Once the voltage zero crossing of a first phase has been determined, the time for voltage zero crossing of phases B and C can be determined based on the known system operating frequency.

Thus, in the method of the present invention, a system X/R ratio (including the X/R for the motor and connecting cables) is calculated and used to determine the closing angle to produce pure symmetrical current. The calculated angle is used to close each phase separately as that angle is met for each individual phase. In particular, current is applied at a point in the line cycle $\Theta$ degrees past a positive zero crossing, where $\Theta$ is the angle whose tangent equals the X/R ratio of the circuit. That is, Tan=X/R. The exact closing angle of the first phase that crosses zero potential to become a positive voltage is determined based on the X/R ratio, and that phase is individually closed at the contactor. The other phases are subsequently closed after appropriate time delays.

Those skilled in this art will appreciate that this broad aspect of the invention can be implemented by many alternative designs; thus, variations on the preferred embodiments disclosed herein can be readily designed within the scope of the invention.

As an example, the calculations performed by the motor starter, and the subsequent switching of the contactors, in a motor startup procedure according to the present invention may be performed in accordance with the flowchart of FIG. 1.

First, the X/R ratio of the motor is provided as an input to the motor starter in block 100, and conductor specifications sufficient to determine the X and R of the conductors (e.g. conductor size and length) are provided to the motor starter in block 102. To facilitate this input process shown in blocks 100 and 102, the motor starter may have particular storage registers for receiving the input quantities. In a preferred embodiment, the motor starter may separately receive and have separate displays for the X/R ratio and the cable information. In this way, maintenance personnel can easily enter and verify the equipment descriptor information entered in blocks 100 and 102 of the flowchart.

In flowchart segment 104, beginning with block 106, the system X/R value is calculated. In general, the "system" X/R ratio is calculated by taking into account the motor X/R ratio, input by the user, and the ratio of X/R for the cable obtained using the total reactance (X) and resistance (R) of the motor cable in use. Although the motor circuit conductor does not have a defined X/R ratio, the ratio of X/R for the cable accounts for the capacitive and inductive reactances $X_C$ and $X_L$ and resistance R of the cable. For nonshielded cables typically used in industrial motor applications, the capacitive factors can be neglected, so that $X_{cable} = X_L$ of the cable.

Examining this calculation in greater detail, in block 106, the capacitance and inductance of the cable are predicted based on the dielectric constant (E) of copper and the input conductor type (solid or stranded). As noted above, for an unshielded cable the capacitive effects of the cable can be neglected. The inductance L is calculated by L=(0.1404

$\log_{10} 2s/d + 0.0153) \times 10^{-6}$ H/ft where, s is the center to center conductor spacing (inches) and d is the diameter over conductor (inches). Using as an example an Okonite FMR Okolon Type TC cable, 500 MCM—3C with ground (2 conductors) 37 strand/EPR insulation, triplexed arrangement, such as might be used with an MCC IE2-BR3 200 Hp, 226 FLA, 1180 RPM 499T frame motor, s=0.92 inches and d=0.788 inches, so L=67.01 nil/ft.

Then, in block 108 the respective capacitive and inductive reactances ($X_C$ and $X_L$) for the cable are calculated. This calculation may be performed using the equation $X_L=2\pi fL$ where f is the frequency (hz), and L is the cable inductance calculated above. For the Okonite FMR Okolon 500 MCM Type TC cable at f=60 Hz, $X_L$=25.26 µH/ft. In cases where capacitive reactance must be considered, the total cable reactance is found as the vector sum of the capacitive and inductive reactance $X_{cable}$ (Ohms/foot). Cable resistance $R_{cable}$ is predicted based on the input conductor size and type. Using the manufacturer's tables for the cable example above, R=27.0 µΩ/ft, giving $X_{cable}/R_{cable}$=0.9356.

In block 110, the total system X/R ratio is calculated for use in controlling the timing of polyphase power application, based on the $X_{cable}/R_{cable}$ and X/R for the motor using the following equation:

$$X_{system}/R_{system}=(X_{cable}+X_{motor})/(R_{cable}+R_{motor}) \quad (3)$$

Also in block 110, Θ is calculated from the system X/R ratio by Equation (2) above. It is desirable to use the system X/R ratio for more accuracy, but in some cases it may be sufficient to base the calculations described herein only on the motor X/R ratio, particularly in those cases where $X_{cable}/R_{cable}$ is very close to one, so that the inclusion of the cable ratio has little effect on the system X/R ratio.

Of course, it would also be possible to manually calculate and enter any of the input data, or even to calculate Θ manually and enter Θ as a value for operation. However, this method would be less desirable because it involves external study and calculation as a part of each motor installation. Further, the calculations would have to be repeated upon repair or replacement of a motor if any of the parameters were changed. By providing data entry and automatic calculation of Θ, the present invention allows fast, effective installation of high efficiency motors without the need for particular calculations by those responsible for the installation.

The system operates in a standby, or data receiving mode, until startup of the motor is desired, by operation of the status test of block 112. When the start button is activated, control is transferred to block 114, otherwise control returns to block 100, any data changes are accepted, and the calculations are updated as described above with reference to section 104 upon receipt of new data.

Upon pressing of the start button, control transfers to block 114. The line voltages of the phase power inputs are monitored. Although it would be possible to monitor only one phase and wait for a positive zero voltage crossing in that phase, preferably all three phases are monitored and the first phase to reach a positive zero voltage crossing is selected as the first to be started. In this way, a more immediate start-up is provided in response to pressing the start button.

In block 116, the contactor associated with the first phase to be closed (the phase for which a zero crossing was detected in block 114) is closed after a delay of Θ electrical degrees after the zero crossing. The timing of the closing is determined by the calculated value of Θ and the known power frequency (e.g. 60 Hz). At 60 Hz, each degree is 1/60 seconds/cycle * 1/360 cycle/degrees=0.0000463 seconds/degree. This factor (or a similarly calculated factor appropriate for the power frequency in the system) is multiplied by Θ to obtain the required time delay.

It is a characteristic of a three phase system that the three phases are 120 degrees apart from each other. Because the system frequency is known (for example, 60 Hz in the United States and 50 Hz in most European nations), a corresponding X/R-based closing time can be calculated for the other phases by simply adding times corresponding to 60 degrees and 120 degrees at the system frequency, respectively, to the first calculated phase timing. For example, at 60 Hz, 60 degrees corresponds to 2.78 milliseconds, so the second phase would be connected 2.78 msec after the first phase and the third phase would be connected 5.56 msec after the first phase. Thus, in block 118, the second phase is connected 60 degrees after Θ, and in block 120, the third phase is started 60 degrees later, at Θ=120 degrees. In this way, all three phases are applied to the motor and the motor is started with minimal current asymmetries.

A preferred embodiment of a motor control apparatus according to the present invention which implements the method described with reference to FIG. 1 will now be described in detail, with particular reference to FIG. 2.

Figure 2:
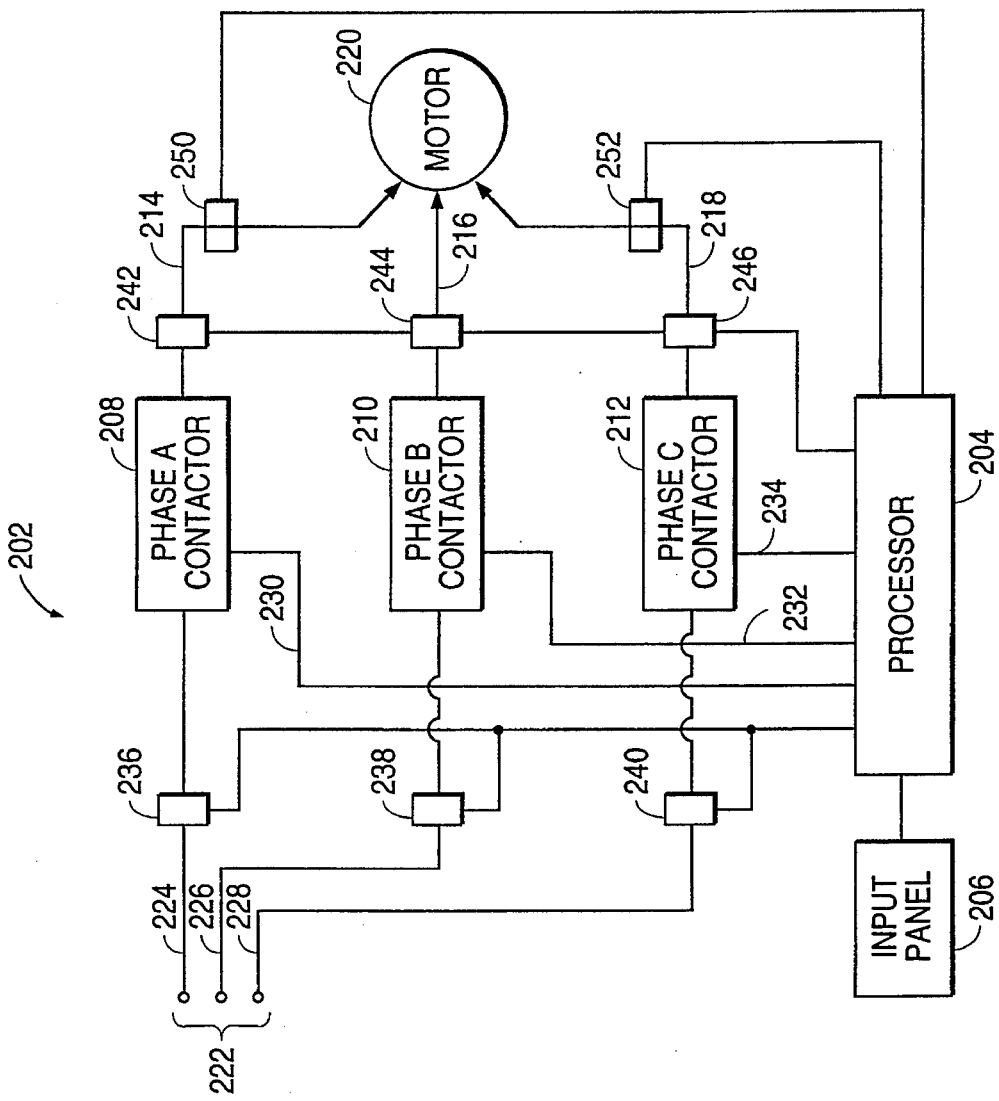
FIG. 2 is a block schematic diagram of a motor starting apparatus which implements the method of the present invention.

FIG. 2 shows a motor starter 202 comprising processor 204, input panel 206, and phase contactors 208, 210, and 212. The phase contactors 208, 210, and 212 of motor starter 202 are connected to a motor 220 by three phase lines 214, 216, and 218 respectively. Phase contactors 208, 210, and 212 are connected, through power input lines 224, 226, and 228 respectively, to a three phase power source 222. Processor 204 is connected by control lines 230, 232, and 234 to phase contactors 208, 210, and 212 respectively. When activating signals are transmitted by processor 204 through control lines 230, 232, and 234, phase contactors 208, 210, and 212 respectively are made to conduct power from the three phase power source 222 to the windings of motor 220.

Contactors 208, 210, and 212 may be conventional contactors but are preferably solid state conducting devices, such as IGBT transistors or power MOSFETS, but a separate device is provided for each phase.

Preferably, the processor is connected to monitor voltage in each phase through sensors 236, 238, 240, 242, 244 and 246. These sensors are of a generally conventional design and measure voltage flowing through each phase, while maintaining complete isolation from the power source. The sensors can recognize both positive and negative transitional states of the cycles in each phase.

Processor 204 comprises a microprocessor or microcontroller, and associated memory, interfacing, and other supporting components, such as EEPROMs for long-time storage of system parameters. Desired calculations, user interface functions, and control of each contactor 208, 210, and 212 are performed by processor 204. Processor 204 performs the necessary functions much faster than the 16.67 msec period of a single 60 Hz A.C. voltage cycle. Thus, the calculations and switching can be completed in a short period of time relative to a single line cycle, and the three independent phase closures can be performed with the exact desired timing, to eliminate asymmetrical current components during startup.

Input panel 206 is a user interface which permits input of system parameters to support the novel angle closure method of the present invention. Referring briefly to FIG. 3, in a preferred embodiment, two displays and two function keys or keypads are provided on the input panel for use in establishing necessary data. A first, flush membrane push button 302 toggles among the items which are entered using input panel 206, such as the motor X/R ratio, cable length, cable material, and type of cable. A description of the item selected for display and entry is provided on display 304 which may be a four digit liquid crystal (LCD) display. The current data for the displayed item is provided on display 306, which may be a four digit liquid crystal (LCD) display. The data for the item is entered by the operator through a key or keypad 308. In particular, the X/R ratio of the motor will be entered by an installer as source data for the calculations. The installer will also input the conductor sizes and lengths for the motor "T" leads, as well as any other information required to make the calculations.

A switch input 31.0 may be provided on input panel 206 to set the processor to perform calculations appropriately for either a 50 Hz or 60 Hz AC power source. In this way, the same contactor can be used with both frequency standards. The setting of this switch will determine the time constant used to determine a 60 degree starting separation of the phases.

Individual contactor control switches 312 may also be provided to permit independent manual control of power application to the three phases controlled by the motor starter 202.

Referring again to FIG. 2, in general, the processor 204 implements a program according to the flowchart of FIG. 1 to receive data and sequentially close the three phases. As noted above, the first phase closure should always occur at a positive voltage for the phase. It is desirable to avoid waiting for an entire line cycle between the first and third closures, not only because of the time involved, but also because 120 degree separations between closings result in a substantial correspondence between voltage zero of the second phase and its closing time, which will produce asymmetries (and may trip an instantaneous circuit breaker). Thus, it is significant in the present invention that the closures are each separated by 60 degrees. In this scheme, the second phase is closed on a negative voltage cycle and the first and third phases are closed on positive voltage cycles. Thus, total time for all three phase closures is 5.56 msec. This method of timing closing substantially reduces or eliminates problems of asymmetries and nuisance tripping, and can be implemented in a cost-effective manner.

Optionally, the motor starter 202 may also be provided with a signal generator 250 for generating a low-voltage (MV) signal that can be initiated by the operator manually depressing a control button 3 14 on the input panel 206 (shown in FIG. 3), and a signal detector 252 for receiving and detecting the signal generated by signal generator 250. The processor 204 can then measure the propagation time of the low voltage signal to the motor and back to the detector 252, adjust accordingly, and estimate the length of the motor cables automatically, under program control, based on the propagation time.

Preferably, processor 204 also monitors the power lines to motor 220 (through sensors 236, 238, and 240) and the operation of the contactors 208, 210, and 212 (through sensors 242, 244, and 246) to verify that each contact closure occurs properly and in correct sequence. Processor 204 verifies correct closures, and also verifies that all three contactors 208, 210, and 212 have opened upon a stop condition. If in a start-up sequence, one phase is not closed after a command to do so, the start-up is cancelled and an error indication is provided. In case of a failure, processor 204 will establish an off state for the motor starter 202 in which no power is applied to the motor 220.

Thus, a novel apparatus and method for starting a motor with phase timing based on the system X/R ratio has been disclosed. This apparatus and method advantageously minimize motor inrush current, and nuisance tripping, using ordinary contactors and without complex algorithms.

I claim:

1. A method of starting a polyphase electric induction motor using an automatic motor starter individually controlling the application of a plurality of phases of an AC power source to the motor, comprising the steps of:

receiving and storing a value of a selected electrical parameter, said value specific to the particular motor, where said parameter is a parameter that takes on a different value depending on asymmetrical startup current characteristics produced by physical structure of the motor;

calculating, based on said stored electrical parameter value, a time delay interval defining a time between when a voltage zero crossing of one of said phases occurs and a time when the same phase is to be connected to the motor to minimize transient asymmetrical startup currents drawn by the motor;

monitoring at least a first of said phases of the power source to detect a power phase voltage zero crossing of the first phase;

upon detection of said phase voltage zero crossing of the first phase, waiting for said time delay interval and then connecting said first phase of the power source to the motor;

after connection of said first phase of the power source, connecting the phases other than said first phase to the motor individually thereafter at timed intervals established to minimize transient asymmetrical startup currents drawn by the motor.

2. The method of claim 1 wherein said electrical parameter comprises an X/R ratio of reactance to resistance for the motor.

3. The method of claim 2 wherein said time delay interval is proportional to an angle $\Theta$ whose tangent is calculated from said ratio.

4. The method of claim 3 wherein said angle $\Theta$ defines the time delay interval in electrical degrees at the frequency of the AC phase power sources.

5. The method of claim 1 wherein said electrical parameter comprises an X/R ratio of reactance to resistance for the motor and its connecting cables.

6. The method of claim 5 wherein said time delay interval is proportional to an angle $\Theta$ whose tangent is calculated from said ratio for the motor and its connecting cables.

7. The method of claim 6 wherein said angle $\Theta$ defines the time delay interval in electrical degrees at the frequency of the AC phase power sources.

8. The method of claim 1 wherein said phase power sources other than said first phase power source are connected at intervals of sixty electrical degrees at the frequency of the AC phase power sources after the connection of said first phase power source.

9. The method of claim 8 wherein said voltage zero crossing is a crossing from negative voltage to positive voltage and said first phase is connected only following said crossing from negative to positive.

10. The method of claim 1 wherein said electrical parameter is a parameter that varies depending on reactance and resistance of the motor.

11. A method of starting a three phase electric induction motor using an automatic motor starter individually controlling the application of a plurality of phases of an AC power source to the motor, comprising the steps of:

obtaining and storing an X/R ratio of reactance to resistance for the motor and its connecting cables;

calculating, based on said stored X/R ratio, a time delay interval defining a time between when a phase voltage zero crossing occurs and a time when the same phase is to be connected to the motor to minimize transient asymmetrical startup currents drawn by the motor, said time delay interval defined by an angle Θ equal to the arctangent of said X/R ratio, with Θ in units of electrical degrees at the frequency of the AC power source;

monitoring at least a first of said phases of the power source to detect a voltage zero crossing of the first phase of the power source;

upon detection of said voltage zero crossing of the first phase, waiting for said time delay interval and then connecting said first phase of the power source to the motor;

after connection of said first phase, connecting the phases other than said first phase to the motor individually thereafter at intervals of sixty electrical degrees at the frequency of the AC power source.

12. An automatic motor starter for starting a polyphase induction motor by individually controlling the application of a plurality of phases of an AC power source to the motor, comprising:

input means for receiving and storing a value of a selected electrical parameter, said value specific to the motor, where said parameter is a parameter that takes on a different value depending on asymmetrical startup current characteristics produced by physical structure of the motor;

calculating means for calculating, based on said stored electrical parameter, a time delay interval defining a time between when a voltage zero crossing of one of said phases occurs and a time when the same phase is to be connected to the motor to minimize transient asymmetrical startup currents drawn by the motor;

monitoring means for monitoring at least a first of said phases of the power source to detect a voltage zero crossing of the first phase and generating an indicating signal in response thereto;

timing means connected to said monitoring means for receiving said indicating signal, tracking time elapsed beginning with the receipt of said indicating signal, generating a first closing control signal after said time delay interval, and generating additional periodic closing control signals at timed intervals after said time delay interval, said timed intervals established to minimize transient asymmetrical startup currents drawn by the motor;

first phase closing means connected to said timing means for receiving said first closing control signal and, in response thereto, connecting said first phase of the power source to the motor;

subsequent phase closing means connected to said timing means for sequentially connecting the phases of the power source other than said first phase to the motor upon receipt of said additional periodic closing control signals until all phase power sources are connected.

13. The apparatus of claim 12 wherein said electrical parameter comprises an X/R ratio of reactance to resistance for the motor.

14. The apparatus of claim 12 wherein said electrical parameter comprises an X/R ratio of reactance to resistance for the motor and associated connecting cables.

15. The apparatus of claim 14 wherein said time delay interval is proportional to an angle Θ whose tangent is calculated from said ratio for the motor and associated connecting cables.

16. The apparatus of claim 15 wherein said angle Θ defines the time delay interval in electrical degrees at the frequency of the AC phase power sources.

17. The apparatus of claim 16 wherein said phase power sources other than said first phrase power source are connected at intervals of sixty electrical degrees at the frequency of the AC phase power sources after the connection of said first phase power source.

18. The apparatus of claim 17 wherein said voltage zero crossing is a crossing from negative voltage to positive voltage.

19. The apparatus of claim 12 wherein said electrical parameter is a parameter that varies depending on reactance and resistance of the motor.

* * * * *